(12) United States Patent
Schlig

(10) Patent No.: US 6,848,862 B1
(45) Date of Patent: Feb. 1, 2005

(54) MULTI-GIMBAL MARINE COMMUNICATION CABLE TO OCEAN BUOY TRANSITION INTERFACE

(75) Inventor: Daniel Louis Schlig, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 10/701,266

(22) Filed: Nov. 4, 2003

(51) Int. Cl.[7] ............................................. F16L 1/12
(52) U.S. Cl. .................... 405/168.2; 405/157; 405/167; 405/168.2; 405/170; 441/23; 367/15; 116/107
(58) Field of Search .............................. 405/154.1, 157, 405/162, 167, 168.1, 168.2, 169, 170; 441/1, 21, 23, 24–26, 11; 367/15, 131–134; 114/326; 116/107, 110

(56) References Cited

U.S. PATENT DOCUMENTS

| | | | | |
|---|---|---|---|---|
| 3,893,305 A | * | 7/1975 | Walker | 405/168.1 |
| 4,216,535 A | * | 8/1980 | Bennett | 441/24 |
| 4,647,255 A | * | 3/1987 | Pow | 405/168.1 |
| 4,687,378 A | * | 8/1987 | Jegousse et al. | 405/171 |
| 6,030,145 A | * | 2/2000 | Stewart et al. | 405/172 |
| 6,276,456 B1 | * | 8/2001 | Head | 405/170 |

FOREIGN PATENT DOCUMENTS

| | | | | |
|---|---|---|---|---|
| JP | 06158571 | * | 6/1994 | 441/32 |

* cited by examiner

*Primary Examiner*—Jong-Suk (James) Lee
(74) *Attorney, Agent, or Firm*—Allen, Dyer, Doppelt, Milbrath & Gilchrist, P.A.

(57) ABSTRACT

A multi-gimbal configured transition protectively interfaces a mooring and communication cable to a communication ocean buoy. The transition interface contains a segmented, flexible sheath formed of a plurality of pivotally interconnected gimbal rings having mutually adjacent interior apertures through which one or more communication link members pass. Successive gimbal rings are orthogonally pivotally interconnected with one another so as to make the flexible sheath flexible in three dimensions. Upper ends of one or more communication link members are connectable with a communication cable connection fixture of the buoy. Lower ends of the communication link members are connectable to communication cable terminal connectors of a terminal end of the mooring cable.

18 Claims, 9 Drawing Sheets

MULTI-GIMBAL MARINE COMMUNICATION CABLE TO OCEAN BUOY TRANSITION INTERFACE

FIELD OF THE INVENTION

The present invention relates in general to communication systems, subsystems and components therefor, and is particularly directed to a new and improved multi-gimbal configured transition for securely and protectively interfacing a mooring and communication cable to a communication ocean buoy.

BACKGROUND OF THE INVENTION

Ocean-deployed communication buoys, a reduced complexity depiction of one of which is shown in FIG. 1, are constantly being subjected to very dynamic forces that have made the integrity of the cable transition interface 10 between the keel 21 of the buoy 20 and a relatively static mooring/communication cable 30 an ongoing problem. Specifically, the substantially continuous (roll, pitch and yaw) motion of the buoy impart forces that act on the cable transition interface in three-dimensions and which, over time, introduce mechanical fatigue at cable and the transition interface. As a consequence, unless the transition interface between the cable and the buoy is both structurally robust and relatively flexible, it can be expected that the mooring attachment 10 with the cable 30 will eventually fail as a result of millions of motion cycles to which the buoy is subjected.

As diagrammatically illustrated in FIG. 2, in an attempt to reduce or ameliorate this problem, currently employed buoy/cable transition interface designs segregate or break out the communication cable interface proper 30 from the mooring cable's attachment interface 40 that is supported by the buoy keel 21. Although the mechanical attachment interface 40 (shown as a dual swivel joint arrangement) accommodates the pitching and rolling motion of the buoy 20 relative to the mooring/communication cable 30, such a cable interface design unfortunately places the most fragile components of the communication cable interface, shown as a pair of optical fiber cable segments 31 and 32 in FIG. 2, outside of the relatively static mooring cable, exposing them to substantial dynamic forces at the ocean surface. Moreover, in their segregated condition, the transition cable segments 31 and 32 take on a configuration that allows them to become entangled with floating sea vegetation and flotsam, fishing/trawler lines/nets, and being subjected to snagging and chafing on the interface mechanism itself.

SUMMARY OF THE INVENTION

In accordance with the present invention, drawbacks of conventional ocean buoy mooring/communication cable transition interfaces, including those discussed above, are effectively obviated by a multi-gimbal configured buoy-cable transition interface, that is configured to decouple relative motion between the buoy and the communication cable on the one hand, and to also provide a structurally robust protective sleeve or sheath structure for the terminal end portion of the communication cable at its exit interface with the mooring cable.

To this end, the multi-gimbal configured buoy-cable interface of the invention comprises a segmented, flexible sheath that is formed of a plurality of double-pivotally interconnected gimbal rings, having mutually adjacent interior apertures through which pass one or more communication link members, such as lengths of electrical or fiber optic communication cable that provide the communication transition between the riser end of the cable and associated terminations at the keel of the buoy. Each of the pivotally interconnected gimbal rings has a dual orthogonal pivoting interface with adjacent gimbal rings on opposite ends thereof, which makes the protective sheath flexible in three dimensions, and thereby accommodates the forces that act on the buoy, so as to mitigate against mechanical fatigue at both the terminal end of the cable and the transition interface.

A respective gimbal ring contains a first, relatively large diameter gimbal ring portion, and a second, relatively small diameter gimbal ring portion that is sized to fit within the first gimbal ring portion of an adjacent gimbal ring. The first gimbal ring portion includes a first pair of pivot apertures, and the second gimbal ring portion includes a second pair of pivot apertures having an axis orthogonal to that of the first pair of pivot apertures, and which are sized to be alignable with a first pair of pivot apertures of an adjacent gimbal ring when the second gimbal ring portion of one gimbal ring is inserted into the first gimbal ring portion of an adjacent gimbal ring. Respective pairs of pivot pins are inserted through aligned first and second pairs of pivot apertures of adjacent gimbal rings, so as to pivotally interconnect adjacent gimbal rings.

The outer surface of a generally cylindrically shaped wall of a relatively small diameter gimbal ring is tapered so as to form a pair of sloped wall regions. These sloped regions provide clearance so the rings can pivot and also keep the passageway open for the cable to pass. These sloped wall regions allow for pivotal movement of adjacent gimbal elements, and thereby the intended flexibility of the cable protecting structure which the multi-gimbal configured buoy-cable interface of the invention provides. An exterior surface of the first gimbal ring portion is provided with stop elements which limit the extent to which the second gimbal ring portion of an adjacent gimbal ring may pivot.

Attachment of the multi-gimbal configured sheath structure to the keel of a buoy is provided by way of an buoy attachment gimbal base that is affixed to the communication cable connection fixture of the buoy, and contains a relatively small diameter gimbal ring portion that is sized to fit within the relatively large diameter gimbal ring portion of the uppermost end one of the pivotally interconnected gimbal rings of the flexible sheath. In a complementary manner, attachment of the multi-gimbal configured sheath structure to the riser end of the communication/mooring cable is provided by way of a riser attachment gimbal ring, that contains a relatively large diameter gimbal ring portion sized to receive a relatively small diameter gimbal ring portion of the lowermost end one of the pivotally interconnected gimbal rings of the flexible sheath.

DETAILED DESCRIPTION

Figure 1:
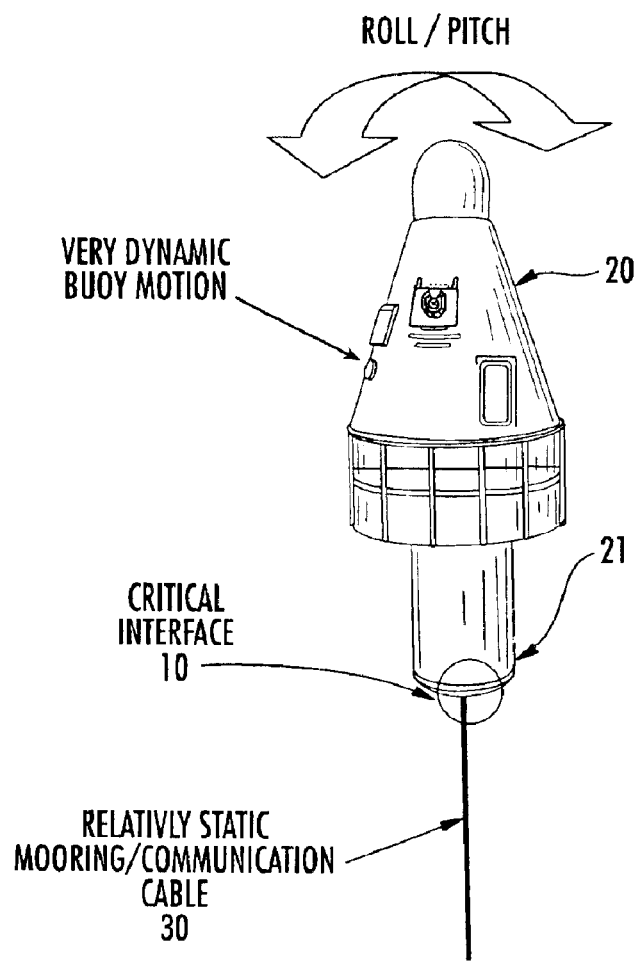
FIG. 1 is a reduced complexity illustration of an ocean-deployed communication buoy.
Figure 2:
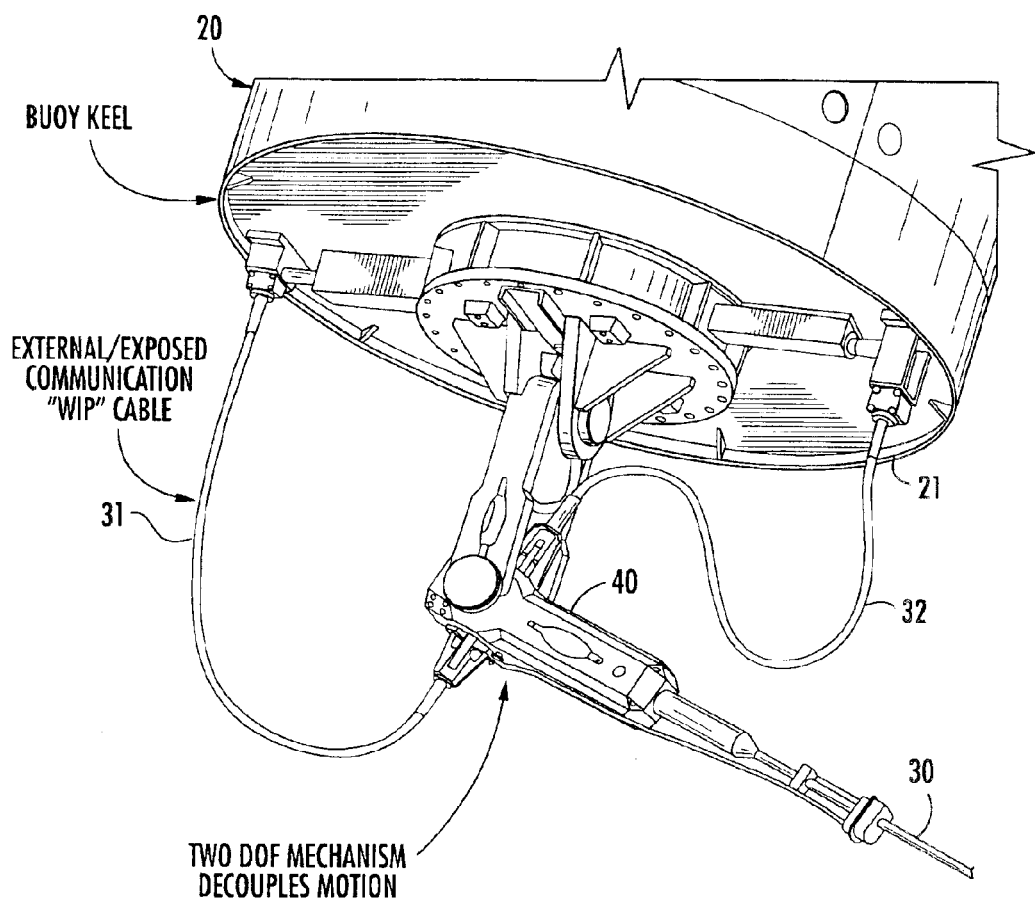
FIG. 2 diagrammatically illustrates a conventional buoy/cable transition interface which breaks out communication cable segments from the mooring cable's attachment.
Figure 3:
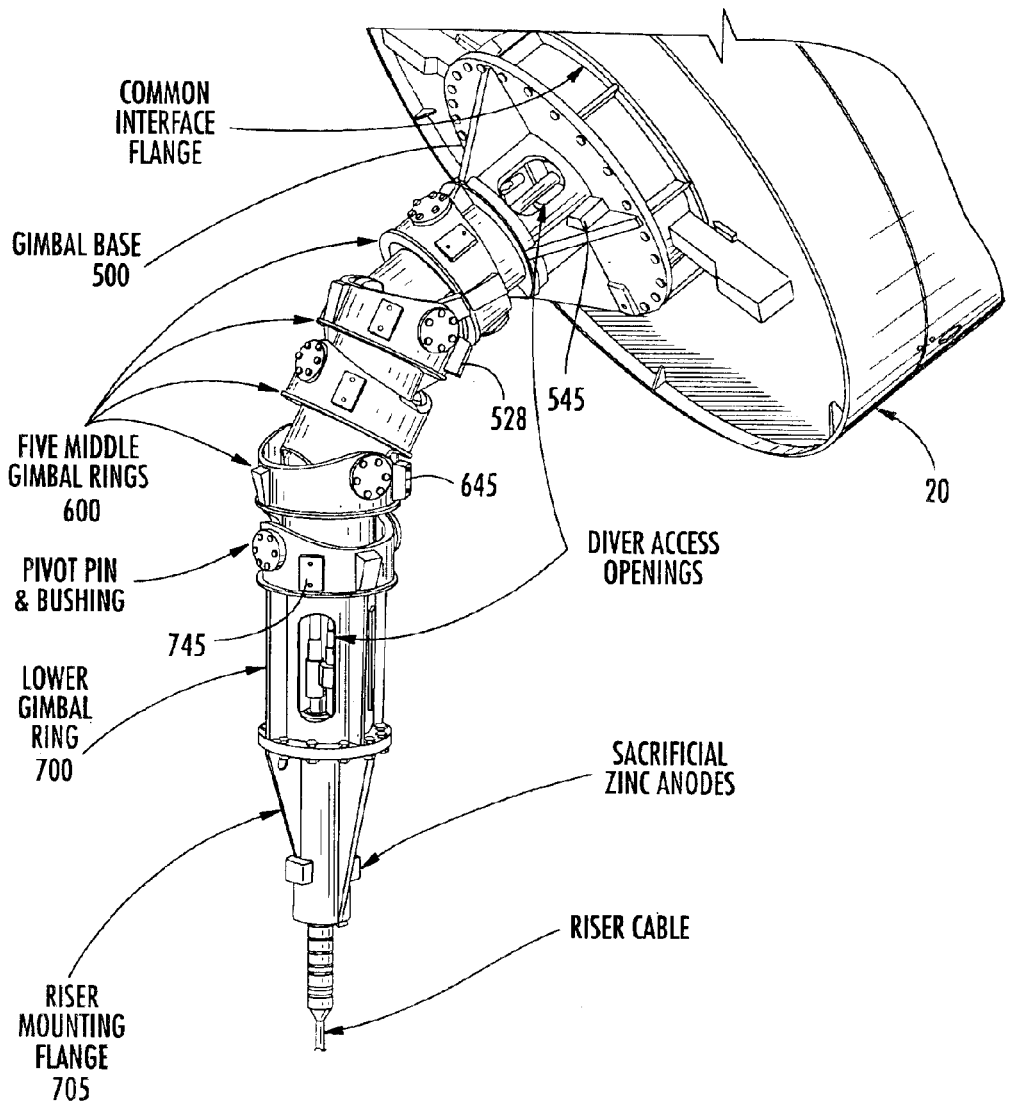
FIG. 3 is a diagrammatic perspective view of a 'flexed' condition of the multi-gimbal configured buoy-cable interface of the present invention.
Figure 4:
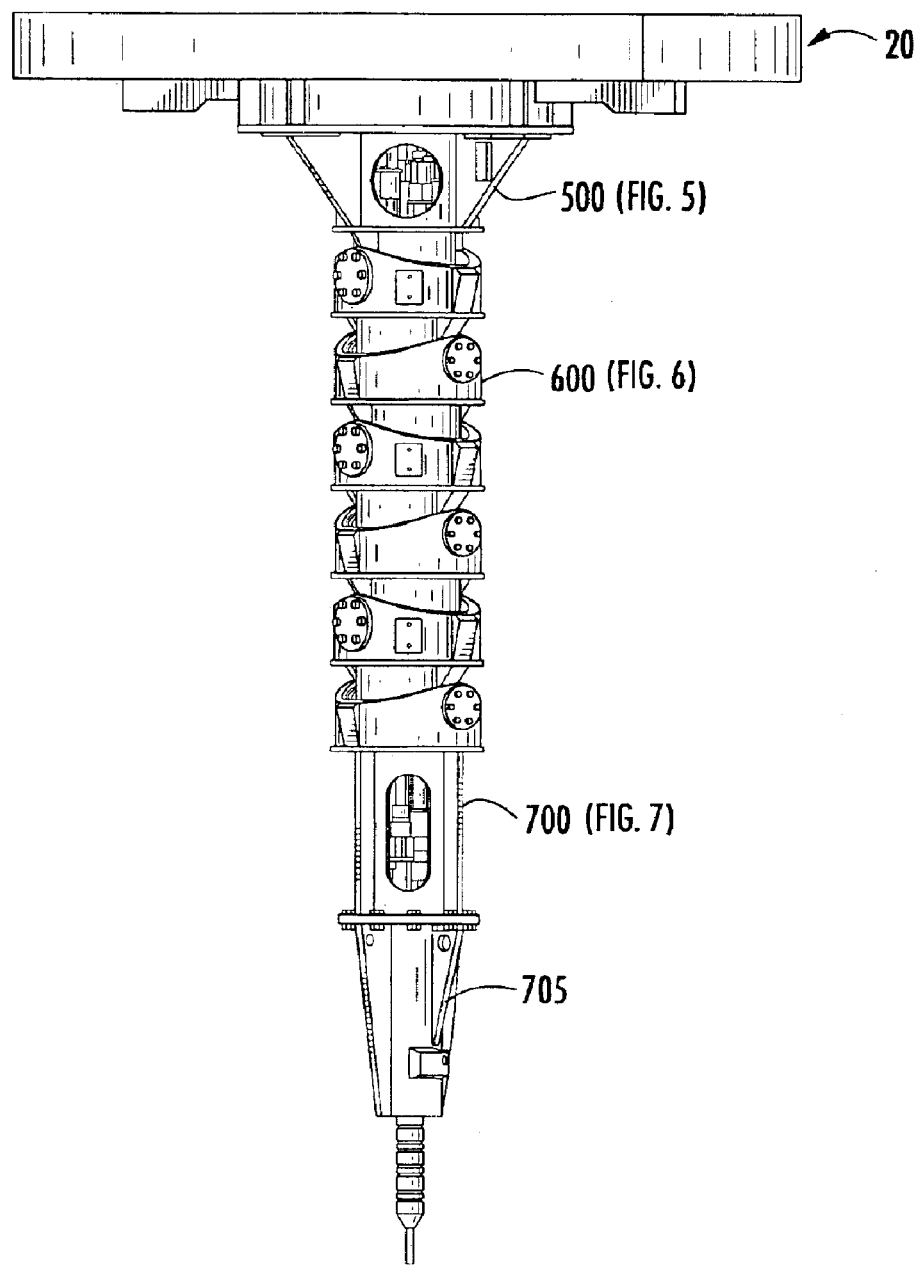
FIG. 4 is a diagrammatic perspective view of an 'in-line' condition of the multi-gimbal configured buoy-cable interface of the present invention.
Figure 5:
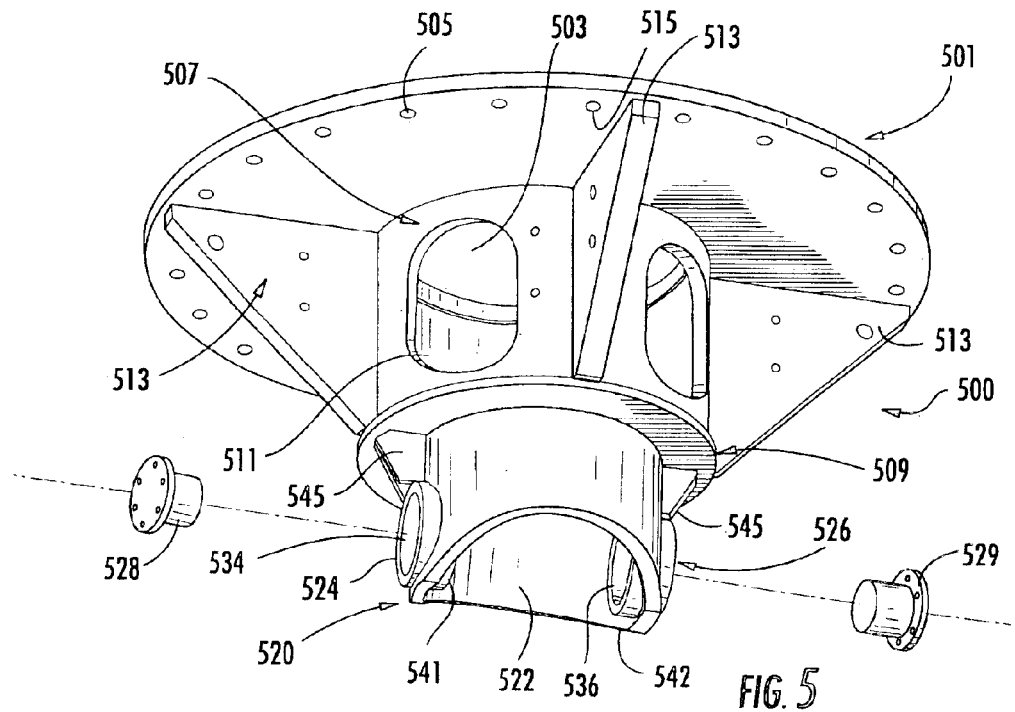
FIG. 5 is a diagrammatic perspective view of an attachment gimbal base portion of the multi-gimbal configured buoy-cable interface of FIGS. 3 and 4.
Figure 6:
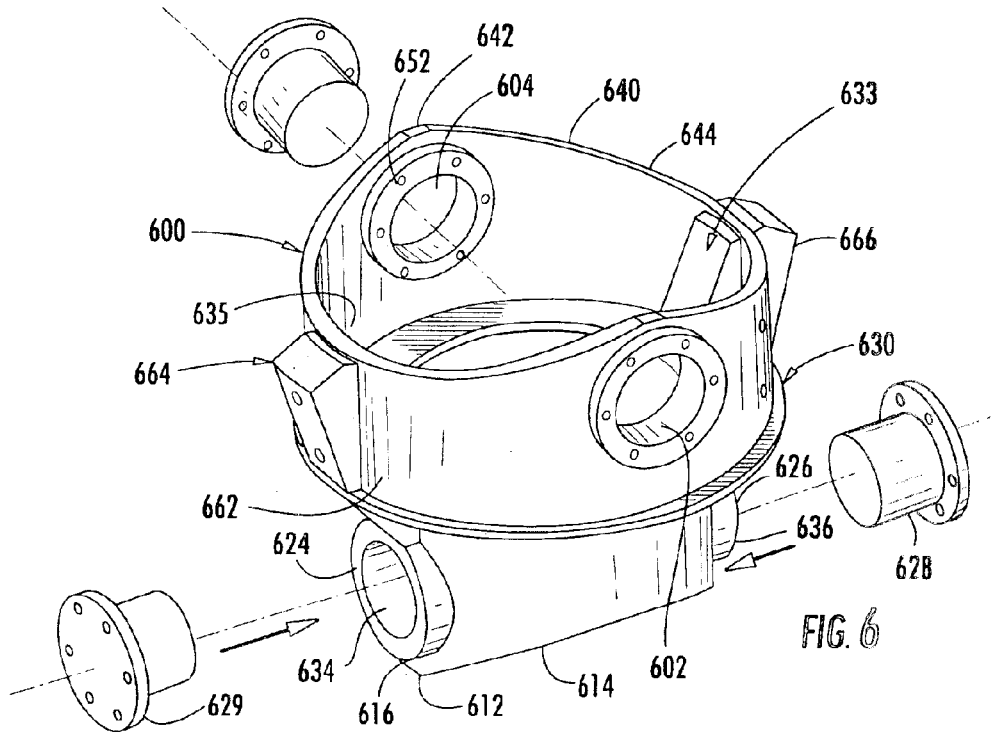
FIG. 6 is a diagrammatic perspective view of a dual axis pivotal gimbal ring of the multi-gimbal configured buoy-cable interface of FIGS. 3 and 4.
Figure 7:
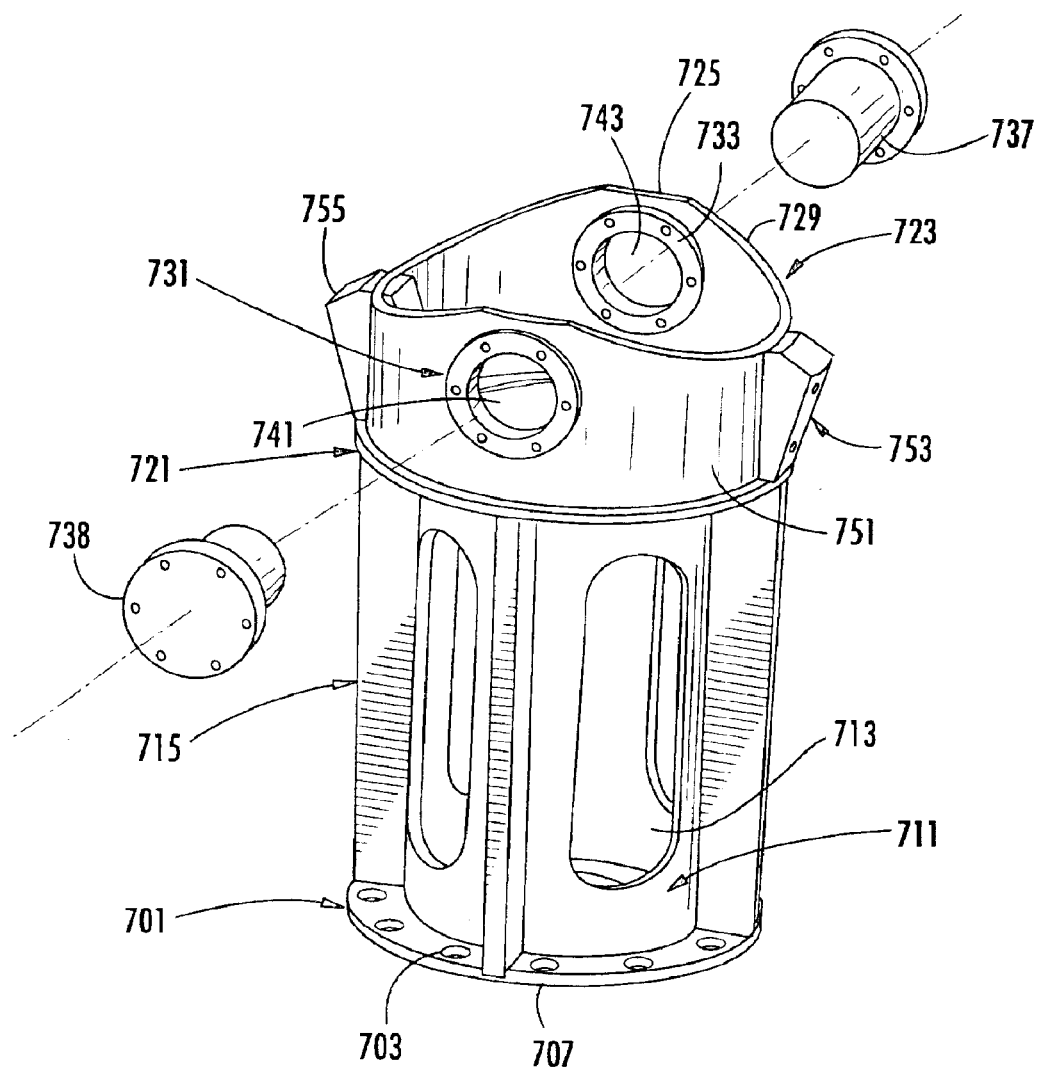
FIG. 7 is a diagrammatic perspective view of a cable riser attachment portion of the multi-gimbal configured buoy-cable interface of FIGS. 3 and 4.

Attention is now directed to FIGS. 3 and 4, which show respective flexed and in-line assembled views of the multi-gimbal configured buoy-cable interface in accordance with the present invention, as well as FIGS. 5, 6 and 7, which illustrate in perspective a buoy attachment gimbal base, a middle gimbal ring, and a cable riser attachment lower gimbal ring, of which the multi-gimbal configured buoy-cable interface shown in FIGS. 3 and 4 is formed. All of the components are preferably made of a structurally rigid and rugged material such as steel. As shown in the assembled views of FIGS. 3 and 4, the multi-gimballed, flexible sheath structure of the invention comprises a cascaded interconnection of a single buoy attachment gimbal base 500, a plurality (five in the illustrated example) of middle gimbal rings 600, and a single cable riser attachment lower gimbal ring 700.

As described briefly above, attachment of the multi-gimbal configured sheath structure of the present invention to the keel of a buoy is provided by way of an buoy attachment gimbal base 500 that is affixed to the communication cable connection fixture of the buoy, and contains a gimbal ring that is sized to fit within the relatively large diameter gimbal ring portion of the uppermost end one of the pivotally interconnected gimbal rings of the flexible sheath.

More particularly, as shown in detail in the perspective view of FIG. 5, the buoy attachment gimbal base 500 is comprised of a generally circular mounting plate 501. A generally circular aperture 503 is formed in the center of the plate 501, while a plurality of bolt attachment bores 505 for attaching the gimbal base 500 to a fixture retained on the keel of the buoy are distributed around the perimeter of the plate 501. Surrounding and substantially flush with the interior edge of the aperture 503 is a generally cylindrical gimbal ring support 507, which extends between the mounting plate 501 and a reducing ring 509, mounted atop the gimbal ring support.

Formed in the generally cylindrical sidewall 509 of the gimbal ring support 507 are a plurality (e.g., four in the present example) of diver-access apertures 511, that are sized to provide a diver ready access to the communication cable interface adjoining the buoy keel. Between the apertures 511 are generally triangular gussets 513 which are welded to the exterior sidewall 509 of the of the gimbal ring support 507 and to the bottom surface 515 of the mounting plate 501. Affixed to the reducing ring 509 is a generally cylindrically shaped, relatively small diameter gimbal ring 520 which, as noted above, is sized to fit within the relatively large diameter gimbal ring portion of the uppermost end one of the pivotally interconnected gimbal rings of the flexible sheath.

The gimbal ring 520 has an interior sidewall 522 that is generally flush with the interior edge of a generally circular hole formed in the reducing ring 509. The outer surface of the generally cylindrically shaped wall of the gimbal ring 520 is tapered so as to form a pair of sloped wall regions 541 and 542 at a distal end of the ring. As described previously shown in FIG. 3, these sloped wall regions allow for pivotal movement of adjacent gimbal elements, and thereby the intended flexibility of the cable protecting structure which the multi-gimbal configured buoy-cable interface of the invention provides.

A pair of gimbal ring pivot pin retention tubes 524 and 526 are formed in diametrically opposed sidewall regions of the gimbal ring 520. These pivot pin retention tubes are sized to receive respective pairs of pivot pins, such as those shown at 528 and 529, which passes through pivot pin bores 534 and 536 in the respective tubes 524 and 526 as well as associated pivot tube bores 602 and 604 in the middle gimbal ring 600 shown in FIG. 6. As shown in FIGS. 3 and 4, the gimbal base 300 is also provided with sacrificial zinc anodes 545 for corrosion mitigation.

The configuration of a respective middle gimbal ring 60 is shown in perspective in FIG. 6 as comprising a lower, relatively small diameter, generally cylindrical gimbal ring section 610, the distal end 612 of which is tapered so as to form a pair of sloped wall regions 614 and 616, to provide for pivotal movement of adjacent gimbal elements. As mentioned previously, the slope of the wall regions is defined so as to provide clearance, so that the rings can pivot and also keep the passageway open for the cable to pass.

A pair of gimbal ring pivot pin retention tubes 624 and 626 are formed in diametrically opposed sidewall regions of the gimbal ring section 610. As in the case of the buoy attachment gimbal base, the pivot pin retention tubes 624 and 626 are sized to pivot pins, shown at 628 and 629, which pass through pivot pin bores 634 and 636 in the respective tubes 624 and 626 as well as associated pivot tube bores 602 and 604 of another gimbal ring.

The lower, relatively smaller diameter, generally cylindrical gimbal ring section 610 abuts against one side of a reducing ring 630, on the opposite side of which is situated an upper, generally cylindrical and relatively larger diameter gimbal ring section 640. A pair of gussets 633, 635 are formed between the interior wall surface of the upper gimbal ring section 640 and the reducing ring 630. Like the lower gimbal ring section 610, the upper gimbal ring section 640 has a distal end 642 thereof tapered so as to form a pair of sloped wall regions 644 and 646, that allow for pivotal movement of adjacent gimbal elements.

However, the sloped wall regions 644 and 646 are generally orthogonal to the sloped wall regions 614 and 616 of the lower gimbal ring section, so as to provide alternating directions of pivot axes between adjacent gimbal ring elements. This dual pivotability of a respective gimbal ring provides the gimbal jointed sheath with flexibility in three dimensions. As noted earlier this enables the protective sheath of the invention to accommodate forces that act on the buoy, so as to mitigate against mechanical fatigue at both the terminal end of the cable and the transition interface.

The interior diameter of the upper gimbal ring section 640 is larger than that of the lower gimbal ring section 610 so as to accommodate pivotal engagement with the lower gimbal ring section of an adjacent gimbal ring. A pair of gimbal ring pivot pin retention tubes 624 and 626 are formed in diametrically opposed sidewall regions of the lower gimbal ring section 610, while a pair of gimbal ring pivot pin retention tubes 652 and 654 through which tube bores 602 and 604 respectively pass, are formed in diametrically opposed sidewall regions of the upper gimbal ring section 640.

The axes of the tube bores 602 and 604 in the upper gimbal ring section 640 are mutually orthogonal to those of tube bores 634 and 636 in the lower gimbal ring section, so as to provide alternating pivot axes between adjacent gimbal ring elements, as described above. As in the case of the buoy attachment gimbal base, the pivot pin retention tubes 624 and 626 of the lower gimbal ring section are sized to receive a pivot pin shown at 628 which passes through pivot pin bores 634 and 636 in the respective tubes 624 and 626 as well as associated pivot tube bores 602 and 604 another gimbal ring.

In addition to the tubes 652 and 654, which are axially orthogonal to the tubes 624 and 626 in the lower gimbal ring section, the exterior cylindrical wall surface 662 of the upper gimbal ring section 640 is provided with a pair of tapered stops 664 and 666. These stops are orthogonal with tubes 652 and 654 and serve to limit the range of pivotal motion of adjacent gimbal ring sections. As further shown in FIGS. 3 and 4, the relatively larger diameter gimbal ring sections 640 are provided with sacrificial zinc anodes 645 for corrosion mitigation.

The configuration of the cable riser attachment, lower gimbal ring is diagrammatically illustrated in FIG. 7 as comprising a generally flat, circular mounting ring which, like the mounting plate 501 of the mounting base of FIG. 5, has a plurality of bolt attachment bores 703 for attaching the lower gimbal ring to an associated generally tapered riser attachment bracket of conventional construction, and shown at 705 in FIGS. 3 and 4. Radially and interiorly offset from the circular circumference 707 of mounting ring 701 is a generally cylindrical gimbal ring 711 having a distribution of diver-access apertures 713 in the cylindrical sidewall thereof. A plurality of stiffening flanges 715 are welded to the outer cylindrical surface of the gimbal ring 711 and to the circular mounting ring 701. The stiffening flanges 715 and the gimbal ring 711 terminate at the bottom side of a reducing ring 721. Mounted to the top of the reducing ring 721 is an upper, generally cylindrical and relatively larger diameter gimbal ring section 723, which is configured the same as the upper gimbal ring section 640 of the middle gimbal ring 600 shown in FIG. 6.

Namely, the upper gimbal ring section 723 of the cable riser attachment lower gimbal ring has a distal end 725 that is tapered so as to form a pair of sloped wall regions 727 and 729, so as to allow for pivotal movement of an adjacent middle gimbal element. Moreover, the interior diameter of the upper gimbal ring section 723 is larger than that of the lower gimbal ring section 610 of a middle gimbal ring, so as to accommodate pivotal engagement with the lower gimbal ring section of an adjacent middle gimbal ring.

A pair of gimbal ring pivot pin retention tubes 731 and 733 are formed in diametrically opposed sidewall regions of the upper gimbal ring section 723. As in the case of the buoy attachment gimbal base, the pivot pin retention tubes 731 and 733 are sized to receive pivot pins 737 and 738, respectively, which pass through pivot pin bores 741 and 743 in the respective tubes 731 and 733, as well as associated pivot tube bores 634 and 636 of a middle gimbal ring. Also, the exterior cylindrical wall surface 751 of the upper gimbal ring section 723 is provided with a pair of stops 753 and 755, that serve to limit the range of pivotal motion of an adjacent gimbal ring section. In order to mitigate against corrosion, opposite sides of the relatively larger diameter gimbal ring section 723 is provided with sacrificial zinc anodes, one of which is shown at 745 in FIGS. 3 and 4.

Figure 8:
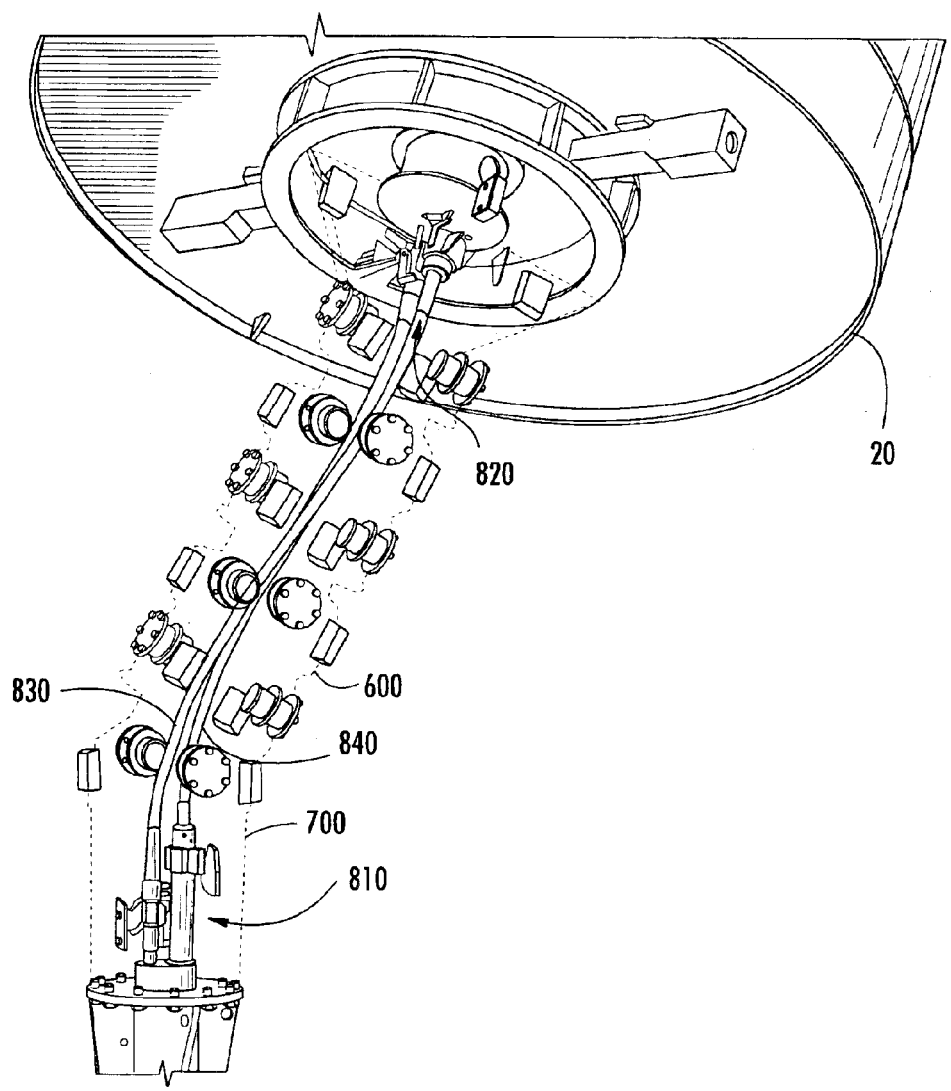
FIGS. 8 and 9 are respective diagrammatic perspective 'transparent' views of flexed and in-line conditions of the multi-gimbal configured buoy-cable interface of the present invention.
Figure 9:
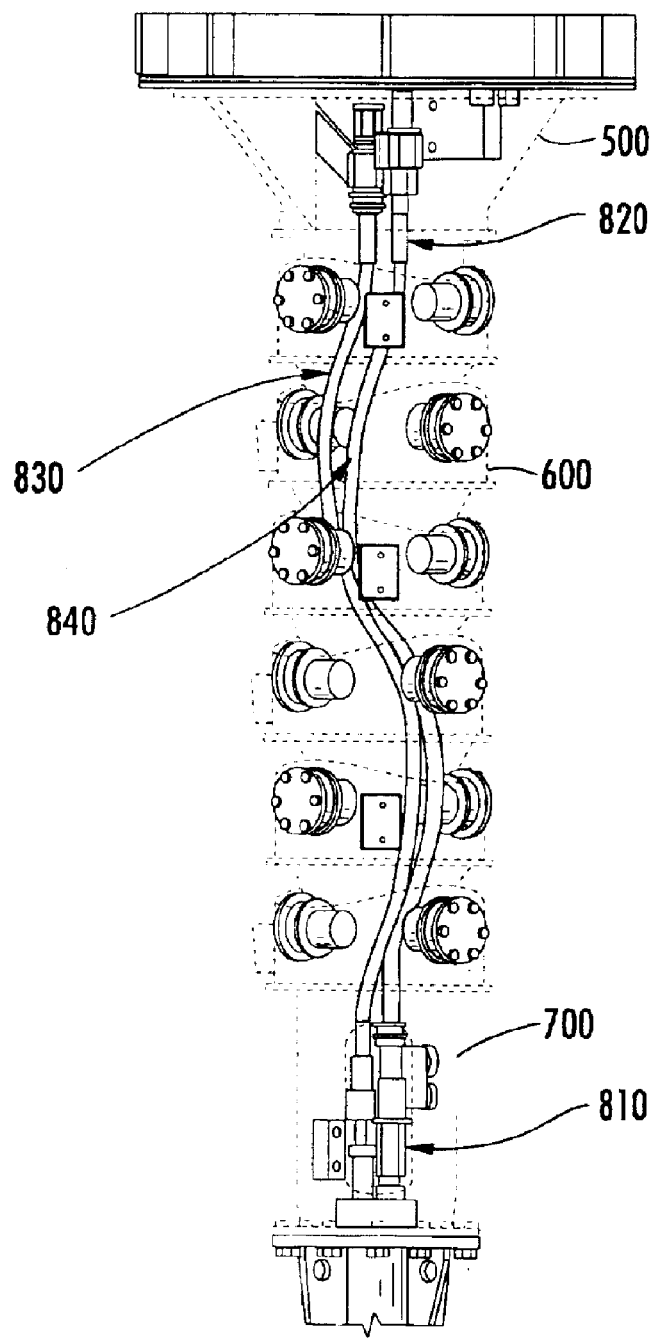

The manner in which the multi-gimbal jointed protective sheath of the present invention allows for flexing of its interior communication cable to accommodate changes in attitude of the buoy keel relative to the cable riser is diagrammatically illustrated in the 'transparent' views of FIGS. 8 and 9. As shown therein, at respective cable connector joints 810, 820 at opposite ends of the transition interface, the interior communication cable sections 830 and 840 are retained in a relatively linear attitude with respect to associated connection terminals in the buoy keel and riser fixtures. However, between these two extremes the cable is allowed to flex or bend, but only to the extent allowed by the gimbals of the multi-gimbal jointed sheath. As pointed out above, the degree of bend is defined by the slope of the wall regions of the two gimbal portions of adjacent gimbals and their adjacent stops.

Figure 10:
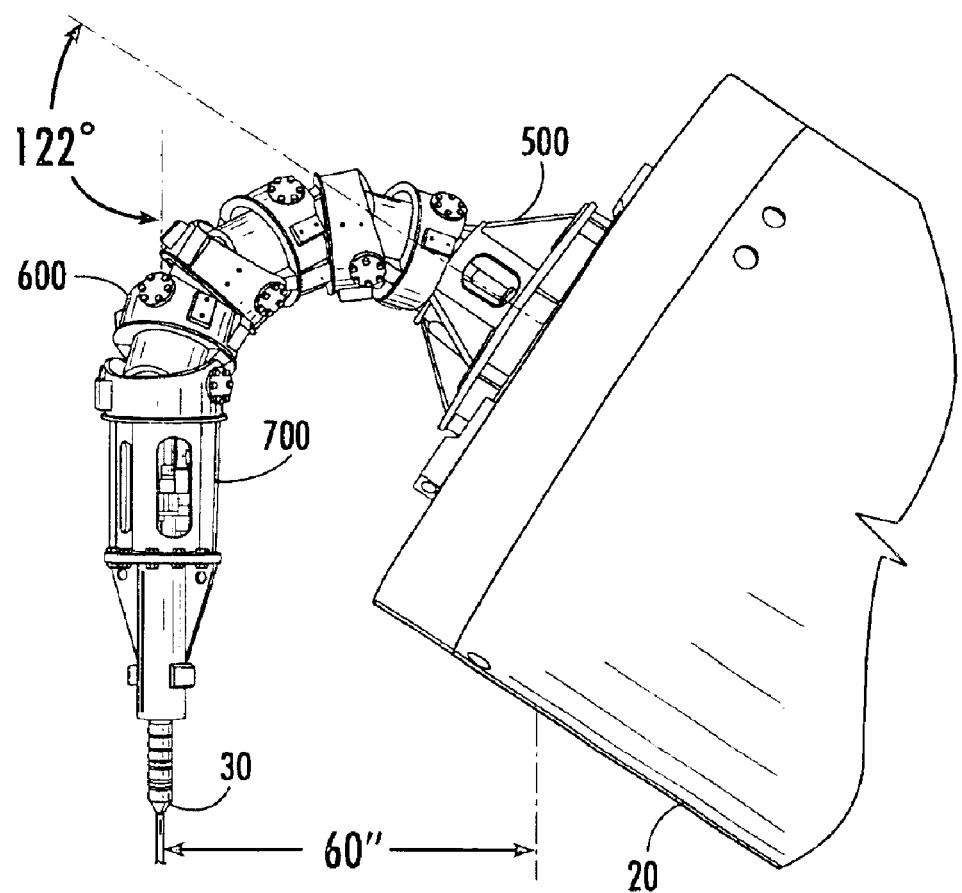
FIG. 10 is a diagrammatically side view illustrating the range of motion of the communication cable transition interface of the present invention.

It will be readily understood by one skilled in the art that the extent to which the communication cable may be bent is further defined by the number of gimbals segments of which the sheath is comprised. For a given size and slope angle of each of the relatively larger and relatively smaller diameter portions of a gimbal ring, increasing the number of gimbal rings that are pivotally interconnected to form the communication interface transition provides a proportional increase in the overall amount of bend of the interior cable, as diagrammatically illustrated in FIG. 10. Still within the interior of the sheath the bend radius remains the same since the bending radius of any two adjoining gimbal rings is not changed by the number of gimbal rings.

While I have shown and described an embodiment in accordance with the present invention, it is to be understood that the same is not limited thereto but is susceptible to numerous changes and modifications as known to a person skilled in the art. I therefore do not wish to be limited to the details shown and described herein, but intend to cover all such changes and modifications as are obvious to one of ordinary skill in the art.

What is claimed:

1. An arrangement for interfacing a marine communication cable, that is retained within a communication buoy mooring cable, with a communication cable connection fixture of a buoy, said arrangement comprising a segmented, flexible sheath structure having an interior passageway that is sized to accommodate therethrough one or more communication link members, first ends of said one or more communication link members being connectable with said communication cable connection fixture of said buoy, and second ends of said one or more communication link members being connectable to communication cable terminal connectors of a terminal end of said mooring cable, and, wherein said segmented, flexible sheath comprises a plurality of pivotally interconnected gimbal rings having mutually adjacent interior apertures through which said one or more communication link members pass.

2. The arrangement according to claim 1, wherein successive ones of said pivotally interconnected gimbal rings are pivotally interconnected with one another so as to make said flexible sheath flexible in three dimensions.

3. The arrangement according to claim 1, wherein each of said gimbal rings comprises a first gimbal ring portion having a first diameter, and second gimbal ring portion having a second diameter, smaller than said first diameter, such that said second gimbal ring portion of said respective gimbal ring fits within the first gimbal ring portion of an adjacent gimbal ring.

4. The arrangement according to claim 3, wherein each of said first gimbal ring portion and said second gimbal ring portion includes a respective pivot structure, such that said second gimbal ring portion of said respective gimbal ring pivots within the first gimbal ring portion of an adjacent gimbal ring.

5. The arrangement according to claim 3, wherein said first gimbal ring portion includes a first pair of pivot apertures, and said second gimbal ring portion includes a second pair of pivot apertures sized to be aligned with a first pair of pivot apertures of an adjacent gimbal ring, and further including respective pivot pins passing through aligned first and second pairs of pivot apertures of adjacent gimbal rings.

6. The arrangement according to claim 5, wherein a first axis passing through said first pair of pivot apertures is orthogonal to a second axis passing through said second pair of pivot apertures.

7. The arrangement according to claim 6, wherein said first gimbal ring portion includes stop elements which limit the extent to which the second gimbal ring portion of an adjacent gimbal ring may pivot about said first axis.

8. The arrangement according to claim 1, further including an attachment gimbal base coupled with said communication cable connection fixture of said buoy, and configured to be pivotally coupled with a first end of one of said pivotally interconnected gimbal rings of said flexible sheath.

9. The arrangement according to claim 8, further including a cable riser attachment gimbal ring configured to be pivotally coupled with a second end one of said pivotally interconnected gimbal rings of said flexible sheath.

10. A method of interfacing a marine communication cable, that is retained within a communication buoy mooring cable, with a communication cable connection fixture of a buoy, said method comprising the steps of:
  (a) providing a segmented, flexible sheath structure having an interior passageway that is sized to accommodate therethrough one or more communication link members;
  (b) inserting one or more communication link members through said segmented, flexible sheath structure; and
  (c) coupling first ends of said one or more communication link members with said communication cable connection fixture of said buoy, and second ends of said one or more communication link members to communication cable terminal connectors of a riser terminal end of said mooring cable; and wherein
  said providing step (a) comprises pivotally intercoupling a plurality of gimbal rings to form said segmented, flexible sheath structure, said gimbal rings having mutually adjacent interior apertures, and
  said coupling step (c) comprises passing said one or more communication link members through said mutually adjacent interior apertures of said plurality of gimbal rings.

11. The method according to claim 10, wherein said providing step (a) further comprises coupling an attachment gimbal base with said communication cable connection fixture of said buoy, and pivotally coupling said attachment gimbal base with a first end one of said pivotally interconnected gimbal rings of said flexible sheath structure, said attachment gimbal base having an interior aperture sized to accommodate first terminal ends of said one or more communication link members.

12. The method according to claim 11, wherein said providing step (a) further comprises pivotally coupling a cable riser attachment gimbal ring with a second end one of said pivotally interconnected gimbal rings of said flexible sheath structure, said cable rise attachment gimbal ring having an interior aperture sized to accommodate second terminal ends of said one or more communication link members.

13. The method according to claim 10, wherein a respective gimbal ring comprises a first gimbal ring portion having a first diameter, and second gimbal ring portion having a second diameter, smaller than said first diameter, such that said second gimbal ring portion of said respective gimbal ring fits within the first gimbal ring portion of an adjacent gimbal ring, and wherein each of said first gimbal ring portion and said second gimbal ring portion includes a respective pivot structure, such that said second gimbal ring portion of said respective gimbal ring pivots within the first gimbal ring portion of an adjacent gimbal ring, and wherein said first gimbal ring portion includes a first pair of pivot apertures, and said second gimbal ring portion includes a second pair of pivot apertures sized to be the aligned with said first pair of pivot apertures of an adjacent gimbal ring, and further including respective pivot pins passing through aligned first and second pairs of pivot apertures of adjacent gimbal rings.

14. The method according to claim 13, wherein a first axis passing through said first pair of pivot apertures is orthogonal to a second axis passing through said second pair of pivot apertures.

15. The method according to claim 14, wherein said first gimbal ring portion includes stop elements which limit the extent to which the second gimbal ring portion of an adjacent gimbal ring may pivot about said first axis.

16. A transition interface for interfacing a marine communication cable, that is retained within a communication buoy mooring cable, with a communication cable connection fixture of a buoy, said transition interface comprising a segmented, flexible sheath formed of a plurality of pivotally interconnected gimbal rings having mutually adjacent interior apertures through which one or more communication link members pass, wherein successive ones of said pivotally interconnected gimbal rings are pivotally interconnected with one another so as to make said flexible sheath flexible in three dimensions, first ends of said one or more communication link members being connectable with said communication cable connection fixture of said buoy, and second ends of said one or more communication link members being connectable to communication cable terminal connectors of a terminal end of said mooring cable.

17. The transition interface according to claim 16, wherein each of said gimbal ring comprises a first gimbal ring portion having a first diameter, and second gimbal ring portion having a second diameter, smaller than said first diameter, such that said second gimbal ring portion of said respective gimbal ring fits within the first gimbal ring portion of an adjacent gimbal ring, and wherein each of said first gimbal ring portion and said second gimbal ring portion includes a respective pivot structure, such that said second gimbal ring portion of said respective gimbal ring pivots within the first gimbal ring portion of an adjacent gimbal ring.

18. The transition interface according to claim 17, further including an attachment gimbal base coupled with said communication cable connection fixture of said buoy, and configured to be pivotally coupled with a first end one of said pivotally interconnected gimbal rings of said flexible sheath, and a cable riser attachment gimbal ring configured to be pivotally coupled with a second end one of said pivotally interconnected gimbal rings of said flexible sheath.

* * * * *